United States Patent
Oie et al.

(10) Patent No.: US 6,330,028 B1
(45) Date of Patent: Dec. 11, 2001

(54) ELECTRONIC IMAGE PICKUP DEVICE WHICH IS OPERABLE EVEN WHEN MANAGEMENT INFORMATION RELATED TO RECORDING/REPRODUCING IMAGE DATA IS NOT READABLE

(75) Inventors: Masahiro Oie; Kazuto Yamamoto, both of Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/566,880

(22) Filed: May 8, 2000

Related U.S. Application Data

(62) Division of application No. 08/798,244, filed on Feb. 11, 1997, now abandoned.

(30) Foreign Application Priority Data

Feb. 15, 1996 (JP) .................................................... 8-027497
Jan. 28, 1997 (JP) .................................................... 9-028399

(51) Int. Cl.⁷ .................................................... H04N 5/76
(52) U.S. Cl. .................................................... 348/231; 348/220
(58) Field of Search .................................... 348/207, 220, 348/231, 232, 233, 222, 239, 552; 386/48, 113, 117, 95; 369/53.12, 53.13, 53.14, 53.15, 53.16, 53.17, 53.18, 53.19; 360/31; H04N 5/225

(56) References Cited

U.S. PATENT DOCUMENTS

| | | | |
|---|---|---|---|
| 5,515,101 | * 5/1996 | Yoshida | 348/232 |
| 5,754,227 | * 5/1998 | Fukuoka | 348/232 |
| 5,796,428 | * 8/1998 | Matsumoto et al. | 348/231 |
| 5,806,072 | * 9/1998 | Kuba et al. | 348/231 |
| 5,867,214 | * 2/1999 | Anderson et al. | 348/231 |

\* cited by examiner

*Primary Examiner*—Tuan Ho
(74) *Attorney, Agent, or Firm*—Frishauf, Holtz, Goodman, Langer & Chick, P.C.

(57) ABSTRACT

An image pickup device includes a flash memory wherein picked-up image data is recorded. The flash memory includes a data block that stores the image data, and managing blocks which store managing data such as directory entries and a FAR chain. Image data is entered into the data block of the flash memory while the managing data is being written. When the power supply is accidentally turned off during the data entering operation and an abnormality occurs in the managing data, correct image data cannot be read out. The image pick-up device provides measures for eliminating such troubles. To this end, the flash memory includes a data block that stores a plurality of image data files, a pair of managing blocks that manage the data block, and a pair of checksum storage areas that have stored check data used to check respective data stored in the pair of managing blocks. An abnormality in each of the two file managing blocks is detected based on a respective one of the check data stored in the two checksum storage areas.

6 Claims, 10 Drawing Sheets

FLASH MEMORY 8

| |
|---|
| HEADED INFORMATION |
| IMAGE DATA BLOCK |
| MEMORY MANAGEMENT INFORMATION |

FIG.2

ELECTRONIC IMAGE PICKUP DEVICE WHICH IS OPERABLE EVEN WHEN MANAGEMENT INFORMATION RELATED TO RECORDING/REPRODUCING IMAGE DATA IS NOT READABLE

This application is a Division of Ser. No. 08/798,244 filed Feb. 11, 1997 abandoned.

BACKGROUND OF THE INVENTION

1. Field of the Invention

The present invention relates to electronic image pickup devices for recording picked-up still image data on a recording medium, and more particularly to an electronic image pickup device for managing the image data recorded on the recording medium. The present invention also relates to information recording devices, data managing methods and recording mediums for electronic cameras.

2. Description of the Related Art

Conventionally, an electronic image pickup device (so-called electronic still camera) which converts an optical still image picked up by a lens to an electric signal through a CCD (Charge Coupled Device), and stores the electric signal as image data in a storage medium such as a semiconductor memory or a floppy disc is known. Since this electronic still camera stores a still image as electrical information, it is capable of converting the stored image data to a video signal and reproducing it in a television set, transferring the image data through communication lines to a remote place, and/or transferring image data to a personal computer. That is, the stored image data can be processed in various manners.

The conventional electronic still camera stores image data, header information indicative of the order of storage of the images, memory addresses in a recording medium (for example, a semiconductor memory) where the image data are stored, and memory management information indicative of allocation of the header information, image data and the memory management information, in the memory. Thus, if the header information/memory management information are broken for some reason during the operation of the still camera, it cannot be known where the image data is stored in the recording medium, and the image data cannot be read out although the image data is stored securely. In addition, the number of images recorded actually will not coincide with that managed by the header information, the recorded image data cannot be read out, and new image data cannot be recorded. That is, the camera does not operate at all.

SUMMARY OF THE INVENTION

It is therefore an object of the present invention to provide an electronic image pickup device which, even when the management information related to recording/reproducing image data is broken and the image pickup device does not operate, is capable of reoperating the system of the device by reconstructing the management information automatically.

In order to achieve the object, the present invention provides an electronic image pickup device comprising:

image pickup means for picking up an image and outputting corresponding image data;

storage means for storing the image data output by the image pickup means and management information about recording/reproduction of the image data;

abnormality detecting means for detecting the occurrence of the abnormality in the management information; and information reconstructing means responsive to the detection of the abnormality by the abnormality detecting means for reconstructing the management information.

In order to achieve the object, the present invention provides an information recording device comprising:

user data storage means for storing user data produced on the basis of information gotten externally;

management data storage means for storing management data which manages said user data storage means;

detecting means for detecting a possible abnormality in the management data stored in said management data storage means; and inhibiting means responsive to the detection of the abnormality by said detecting means for inhibiting the use of the management data stored in said management data storage means.

In this arrangement, when there occurs an abnormality in the management data stored in the management data storage means, the detecting means detects the abnormality. In response to this operation, the inhibiting means inhibits the use of the management data stored in the management data storage means.

In order to achieve the object, the-present invention provides a data managing method in an information recording device which stores user data produced on the basis of information gotten externally, comprising the steps of:

storing management data for managing storage means which stores the user data when the user data is stored;

detecting a possible abnormality in the stored management data, as requested; and inhibiting the use of the stored management data when an abnormality is detected in the stored management data.

According to this method, the use of the management data in which an abnormality has occurred is inhibited automatically, and the operation of the electronic camera due to the management data in which the abnormality has occurred is stopped or avoided.

The present invention also provides a data storage medium which contains a program for controlling the storage of data by a computer, the data storage medium storing, when user data produced on the basis of information gotten externally is stored, management data which manages storage means which stores the user data; detecting a possible abnormality in the stored management data, as requested; and inhibiting the use of the stored management data when the abnormality is detected.

The use of the program stored in the storage medium automatically inhibits the use of the management data in which the abnormality has occurred, and inhibits and/or avoids the operation of the electronic camera due to the management data in which the abnormality has occurred, in a device which includes a computer.

BRIEF DESCRIPTION OF THE DRAWINGS

FIG. 2 schematically illustrates the structure of a flash memory of the electronic still camera;

DESCRIPTION OF THE PREFERRED EMBODIMENT

Preferred embodiments of the present invention will be described below with reference to the accompanying drawings.

(1) First Embodiment

Structure

Figure 1:
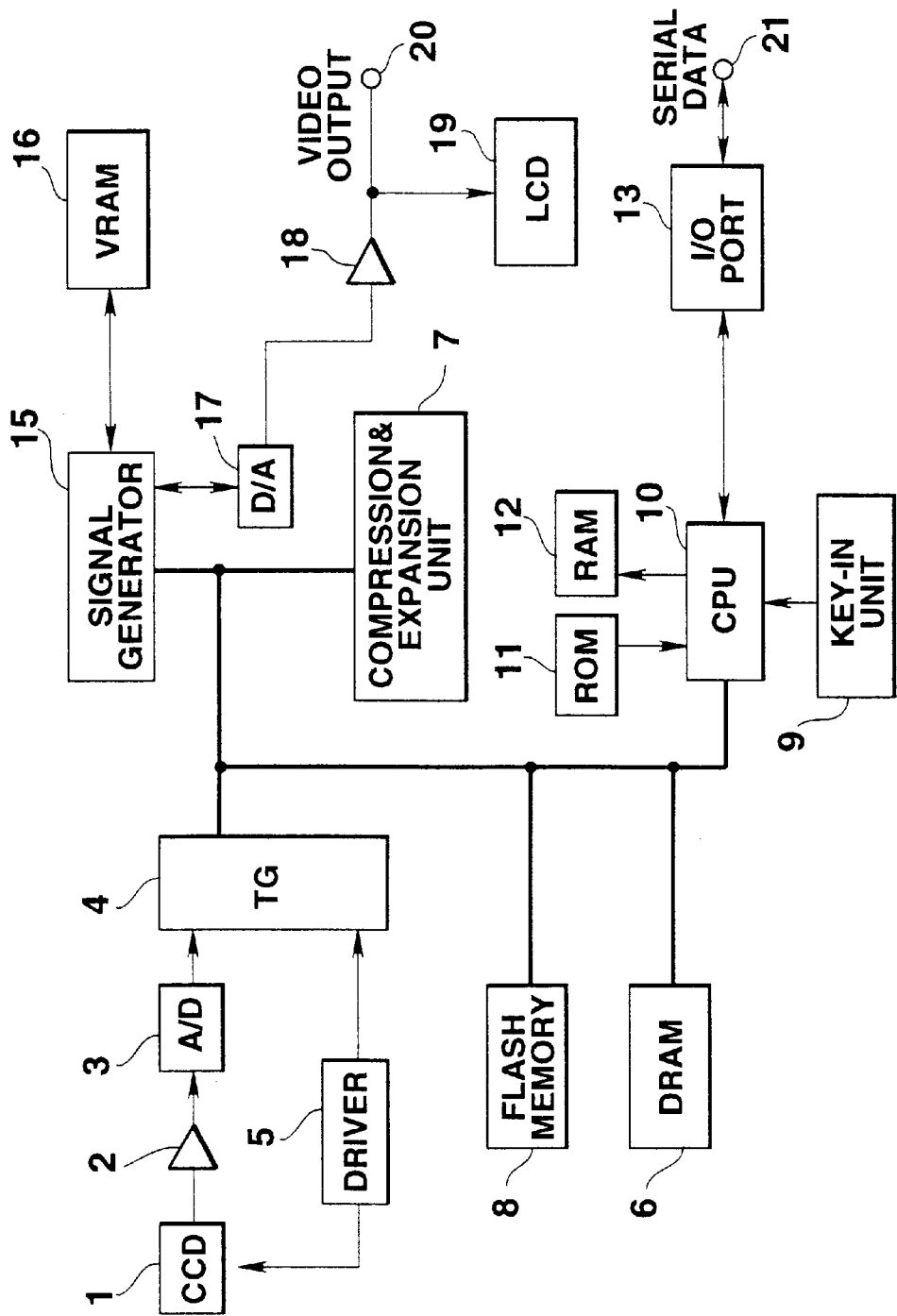
FIG. 1 is a block diagram of an electronic still camera as one embodiment of the present invention.

Referring to FIG. 1, there is provided an electronic still camera as the first embodiment of the present invention. In this camera, a CCD 1 converts a still image focused through an optical system (not shown) to an electric signal, which is then delivered to a buffer amplifier 2. The buffer 2 amplifies the still image signal to a predetermined degree and delivers the resulting signal to an A/D converter 3. The A/D converter 3 converts the still image signal to a digital image data, which is then delivered to a timing generator (TG) 4. The TG 4 generates a timing signal to control a driver 5 which drives the CCD 1, delivers the timing signal to the driver 5, gets the image data in accordance with the timing signal, and outputs the image data to a data bus.

A dynamic memory (DRAM) 6 temporarily stores image data output by the TG4. The image data is read by a CPU 10 when an image for one picture is picked up and is subjected to a color operation which divides a brightness signal and a color signal. A compression/expression unit 7 compresses the separated brightness signal and color signal in accordance with an expression process such as a joint photographic coding experts group (JPEG) system and expands the compressed image data.

Figure 3:
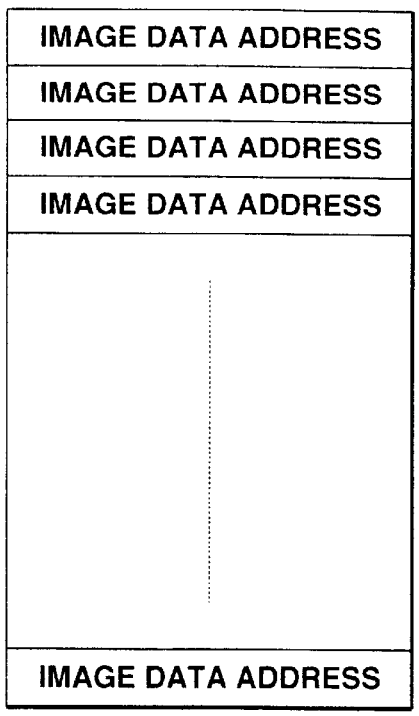
FIG. 3 schematically illustrates the composition of header information.
Figure 4:
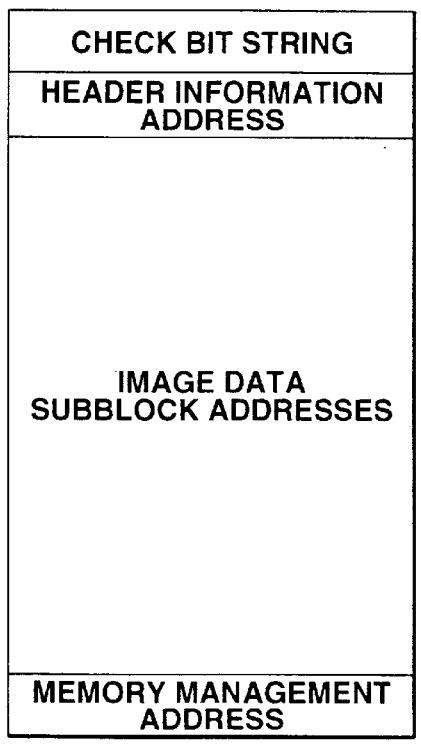
FIG. 4 schematically illustrates the composition of memory management information.

A flash memory 8 stores the compressed image data (brightness signal and color signal) along with header information, an image data block, and memory management information, as shown in FIG. 2. As shown in FIG. 3, the header information includes address information about where image data recorded sequentially by the camera are recorded in the flash memory 8. The image data block is an area where the image data is stored. As shown in FIG. 4, the memory management information includes a check bit string, an address where header information is stored, an address of the image data block where image data is recorded, and an address where the memory management information is stored.

A key-in unit 9 includes a record (shutter) key, a reproduction key and an image feed key for setting corresponding record, reproduction, and image feed modes of the still camera, and switches for setting various values. The respective states of the key-in unit 9 are gotten as corresponding data by CPU 10.

CPU 10 controls the respective elements of the still camera in accordance with programs contained in a ROM 11 and the respective states of the switches of key-in unit 9. Especially, in the present embodiment, CPU 10 determines whether the memory management information and the header information are normal in a process to be described later. If an abnormality has occurred, CPU 10 reconstructs the memory information and header information depending on the degree of the abnormality.

A RAM 12 is used as a working area for CPU 10. An I/O port 13 function as an interface through which a serial signal to which a video signal is converted is input/output. Especially, in the present embodiment, the I/O port 13 is used to send/receive recorded image data to/from other devices (for example, another electronic still camera, a computer, etc.) through a terminal 20. A signal generator 15 converts image data composed of the brightness signal and color signal expanded by the compression/expression unit 7 to a video signal and adds a sync signal to the video signal to form a digital video signal, which is then output to a video RAM (VRAM) 16 and a D/A converter 17.

A VRAM 16 temporarily stores the digital video signal. A D/A converter 17 converts a digital video signal output by the signal generator 15 to an analog video signal, which is then output via a buffer 18 from an output terminal, and also delivered to a liquid crystal display (LCD) 19, which displays a video in accordance with the analog video signal fed through the buffer 18.

Operation

When an image is to be picked up, first, the record key of the key-in unit 9 is depressed to set a record mode. In response to this operation, CPU 10 gets a video signal from CCD 1 at predetermined intervals of time into DRAM 6, converts it to image data composed of a brightness and a color signal. The image data is then converted to a video signal by the signal generator 15. The converted video signal is then displayed via the D/A converter 17 on the LCD 19. Thus, image gotten from CCD 1 is displayed on the LCD 19 at predetermined intervals of time.

When the shutter (record) key of the key-in unit 9 is depressed, CPU 10 gets and stores the image focused in CCD 1 at present into DRAM 6. CPU 10 performs a color operation on the image data stored in DRAM 6 and transfers the resulting image data to the compression/expansion unit 7. When the compression/expression unit 7 compresses the transferred image data, it transfers and store the compressed image data to and in flash memory 8. Simultaneously, it writes memory management information into the flash memory 8.

In reproduction, first, the reproduce key of the key-in unit 9 is depressed to set a PLAY mode. In response to this operation, CPU 10 transfers the first compressed image data to the compression/expansion unit 7 on the basis of the memory management information in the flash memory 8. The compression/expansion unit 7 expands the transferred compressed image data and transfers it to DRAM 6. CPU 10 transfers the expanded image data written in DRAM 6 to the signal generator 15, which reproduces an image on LCD 19 through D/A 17 and buffer 18.

An error processing operation performed by the inventive electronic still camera will be described next with reference to the flow chart of FIG. 5A and 5B. When a power supply (not shown) is turned on by depressing a power supply key (not shown) of the key-in unit 9, first, CPU 10 determines at step S10 of FIG. 5A on the basis of a check bit string of the memory management information of FIG. 4 whether the memory management information is normal. If so, control passes to step S12, which determines whether the header information is normal. If so, the control passes to step S14, which performs a regular camera operation.

If the header information is abnormal, the result of the determination at step S12 is NO, and the control passes to step S16, which displays "Memory error #1" on LCD 19 to inform the user about the occurrence of an abnormality in the header information. Alternatively, a first error icon may be displayed. Next, at step S18, CPU 10 determines whether a recovery key (not shown) of the key-in unit 9 has been depressed.

When the user depresses the recovery key after viewing LCD 19, the control passes to step S20, which clears the header information in flash memory 8. At step S22, CPU 10 searches an image data area in the flash memory 8 for image data and reconstructs header information on the basis of the obtained image data and writes the reconstructed header information into the flash memory 8 at step S24. Thus, although the order of recording image data is not reproduced, a regular camera operation can be performed without losing any image data.

Figure 5A:
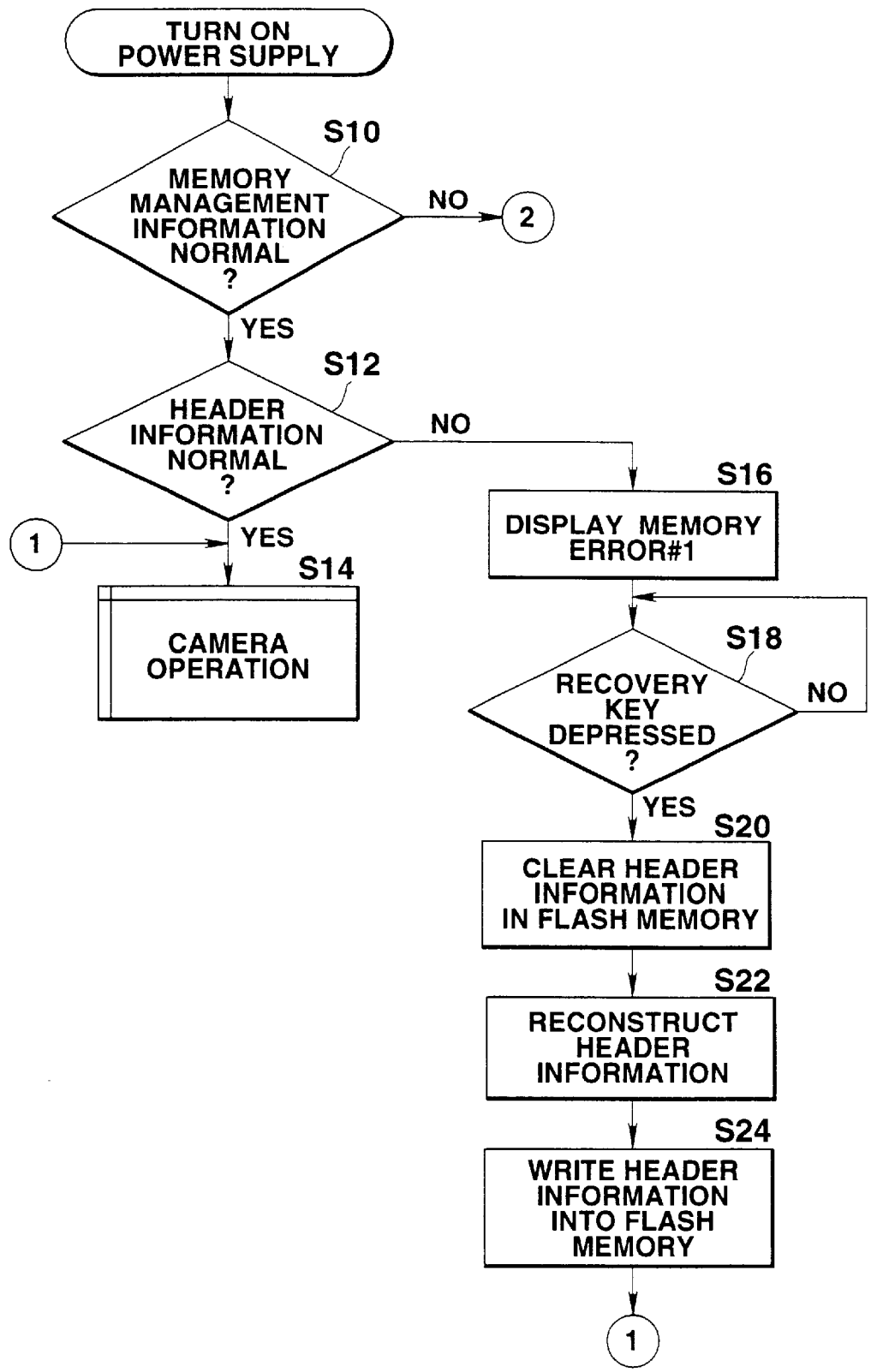
FIGS. 5A and 5B are flow charts indicative of an error processing operation of the electronic still camera.
Figure 5B:
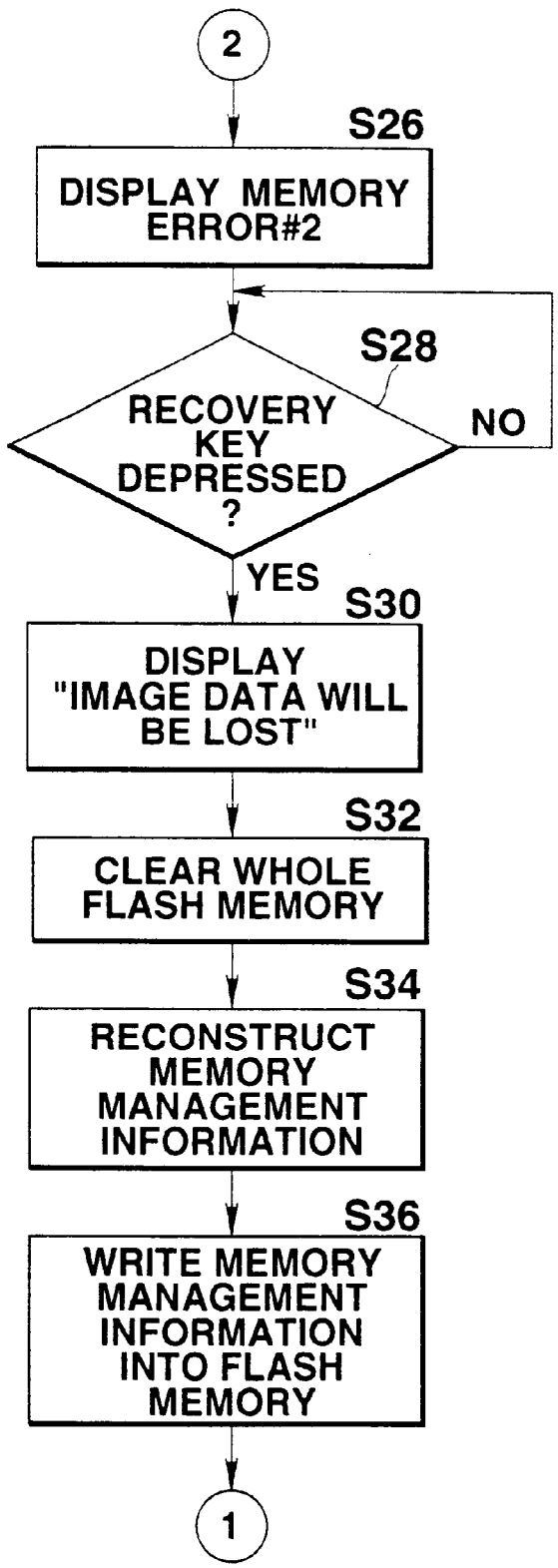

If an abnormality is detected in the memory management information, the determination at step S10 becomes NO and the control passes to step S26 of FIG. 5B, which displays "Memory error #2" on LCD 19 to inform the user about the occurrence of an abnormality in the memory management information. Alternatively, a second error icon may be displayed.

Addresses of the header information, image data block, and memory management information are lost when there occurs an abnormality in the memory management information, CPU 10 cannot determine how those information are allocated in the flash memory 8. Thus, those information cannot be recovered automatically without losing any image data, as in the occurrence of abnormality in the header information.

To avoid this undesirable situation, CPU 10 determines at step S28 whether the recovery key of the key-in unit 9 has been depressed. If so, the control passes to step S30 which displays "Image data will be lost" on LCD 19. Next, at step S32 CPU 10 clears the whole flash memory 8. At step S34, CPU 10 reconstructs the memory management information, and at step S36, writes the reconstructed memory management information into the flash memory 8. Thus, although the recorded image data is lost, the regular camera operation can be performed.

In summary, according to the present invention, the image data output by the image pickup means (CCD 1) is stored along with management information about the recording/reproduction of the image data (FIG. 4) in the storage medium (flash memory 8) When the occurrence of an abnormality in the management information is detected by the abnormality detecting means (CPU 10) during operation, the management information is reconstructed by the information reconstructing means (CPU 10). Thus, even when the management information about the recording/reproduction of the image data is broken and the camera does not operate, the management information is automatically reconstructed to restart the system, advantageously. Even when no image data can be read out due to the breakage of the header information although there is the image data, the header information is reconstructed and image data can be read out.

While in the embodiment it is determined whether at step S18 of FIG. 5A and at step S28 of FIG. 5B whether the user has depressed the recovery key, those steps may be omitted to reconstruct the header information and memory management information completely and automatically.

(2) Second Embodiment

Structure

A second embodiment of the present invention relates to a digital camera. The second embodiment shares the same block diagram of FIG. 1 with the first embodiment. The same reference numeral is used to denote similar elements of the second and first embodiments, and the description of those similar elements will be omitted. Only elements of the second embodiments different from those of the first embodiment will mainly be described next.

A key-in unit 9 includes a power supply key operated to turn on/off a power supply (not shown), a video get key operated to store a video into a flash memory 8, a mode switch key operated to switch the operation mode from a record mode to a play mode and vise versa, a play key operated to reproduce an image based on image data stored in the flash memory 8, and a delete key operated to delete image data stored in the flash memory 8 (Those individual keys are not shown).

CPU 10 operates on the basis of keyed-in information from the key-in unit 9 and a program stored in ROM 11, uses RAM 12 as a work area, executes all processes necessary for the digital cameral, and controls the respective elements of the camera. CPU 10 functions as detecting means, inhibiting means, check data getting means and updating means in the second embodiment.

Figure 6:
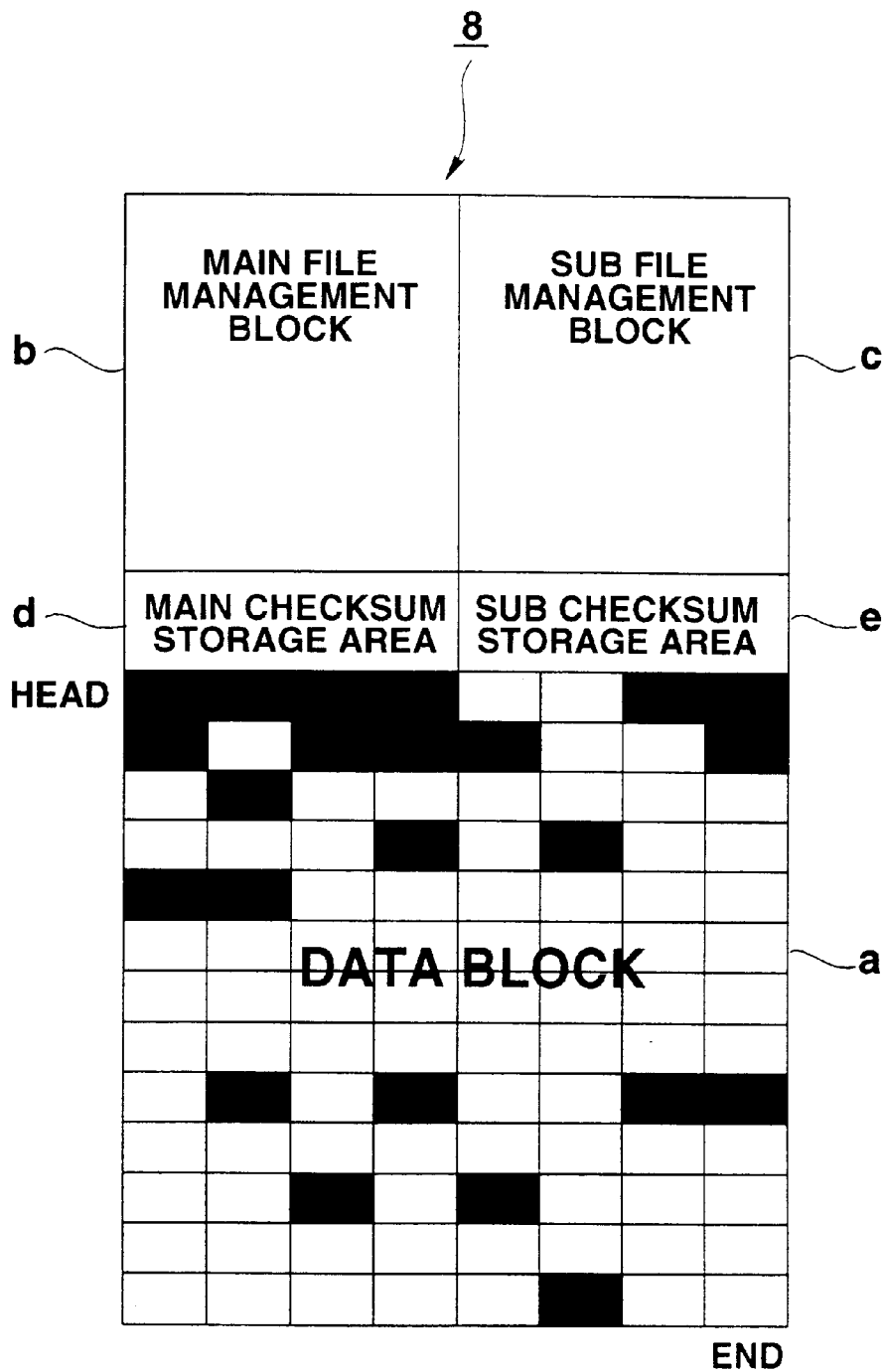
FIG. 6 schematically illustrates the storage composition of data in a flash memory in a second embodiment.

The flash memory 8 realizes user data storage means, management data storage means and check data storage means in the second embodiment. As shown in FIG. 6, the flash memory 8 includes, as storage areas, a data block a, a main file management block b, a sub file management block c, and a main checksum storage area d and a sub checksum storage area e corresponding to the file management blocks b and c. The data block a includes a plurality of sub-blocks in some of which image data and other data annexed to the image data are handled and stored as one file. Stored in the main file management block b is file management data (directory entry, FAT chain, etc.) to manage the data block a. Stored in the main checksum storage area d is checksum data of management data stored in the main file management block b. Stored in the sub file management block c is file management data which is the same as that stored in the main file management block b. Stored in the sub checksum storage area e is checksum data of management data stored in the sub file management block c.

Operation

Figure 7:
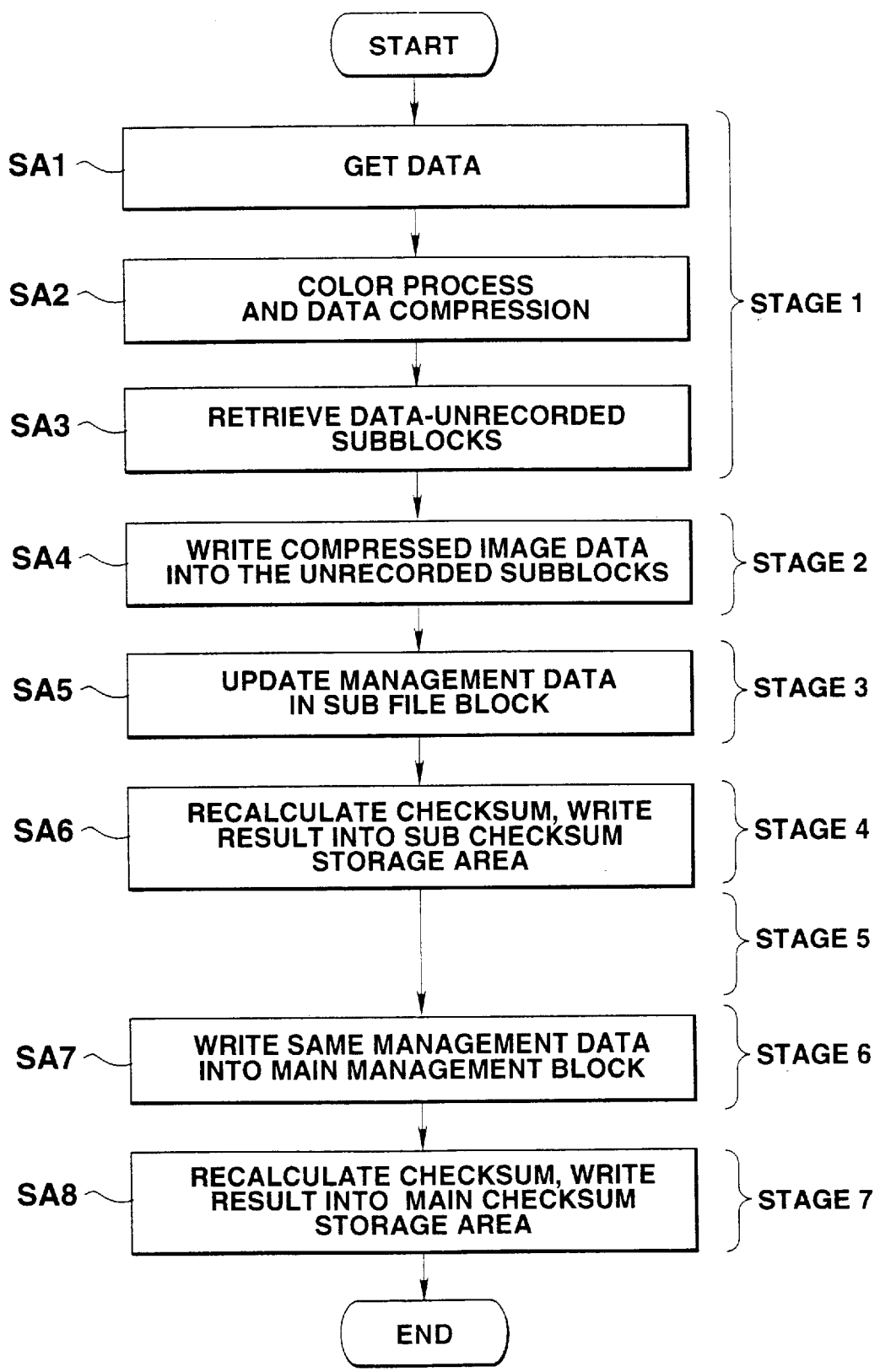
FIG. 7 is a flow chart indicative of a data recording operation in the second embodiment.
Figure 8:
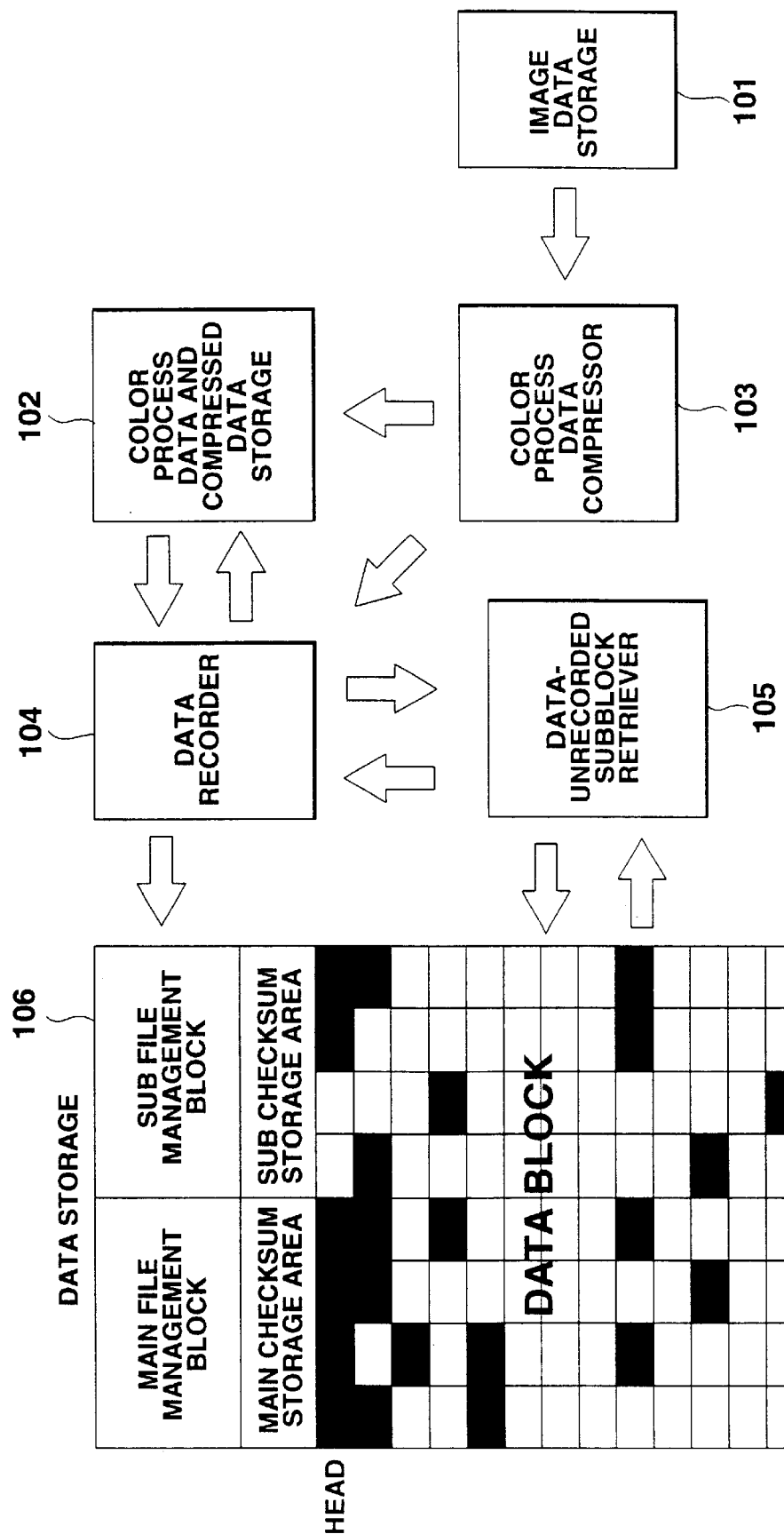
FIG. 8 schematically illustrates of the flow of data in the data recording operation in the second embodiment.

The data recording operation of the electronic camera of the second embodiment will be described with reference to a flow chart of FIG. 7 indicative of the control contents of CPU 10. FIG. 8 is a schematic block diagram indicative of the flow of data in the camera operation to be described below. In FIG. 8, an image data storage 101 and a compressed-color process data storage 102 each corresponds to DRAM 6. A color process data compression unit 103 corresponds to the compression/expansion unit 7. A data recording unit 104 and a data-unrecorded block retrieval unit 105 each correspond to CPU 10. A data storage 106 corresponds to the flash memory 8.

When the video get key of the key-unit 9 is depressed to record a desired object image in the state where the record mode is set, CPU 10 generates and sends a video get signal to TG 4 to get image data via the buffer amplifier 2, and A/D converter 3 from CCD 1 and temporarily stores the data in DRAM 6 (SA1). CPU 10 then performs a color processing operation (picture production) on the stored image data and transfers the resulting data to the compression/expansion unit 7 to perform an data compression process such as the JPEG system, and stores the resulting data temporarily in DRAM 7 (SA2). In order to record the processed image data, CPU 10 retrieves sub-blocks where no image data are recorded from the head (the top left of FIGS. 6 and 8) in the flash memory 8 (SA3), and stores the compressed image data stored temporarily in DRAM 6 into the unrecorded sub-blocks which are retrieved first (SA4). Subsequently, in order to render effective the use of the recorded image data, first, CPU 10 updates management data in the sub file block c (SA5), recalculates the check sum with the updated data, and writes the result into the sub checksum storage area e (SA6). In addition, CPU 10 writes management data having the same contents as the management data last written in the sub file block c into the main management block b (SA7), recalculates the checksum with the updated data, writes the result into the main checksum storage area d (SA8), and terminates the processing.

If, for example, an AC adapter (not shown) is inadvertently or erroneously pulled out from the camera and its power supply is turned off or the battery voltage drops abruptly and the processing is interrupted in any one of a stage 1 covering steps SA1–SA3, a stage 2 covering step SA4, a stage 3 covering step SA5, a stage 4 covering a step SA6, a stage 5 covering the interval between steps SA6 and SA7, and stages 6 and 7 covering steps SA7 and SA8, respectively, one of the next situations is expected to occur in the flash memory 8.

TABLE 1

|  | IMAGE DATA | SUB MAN-AGE-MENT | SUB MAN-AGEMENT CHECK-SUM | MAIN MANAGE-MANT | MAIN MANAGE-MENT CHECKSUM |
|---|---|---|---|---|---|
| STAGE 1 | Δ | Δ | Δ | Δ | Δ |
| STAGE 2 | x | Δ | Δ | Δ | Δ |
| STAGE 3 | ○ | x | Δ | Δ | Δ |
| STAGE 4 | ○ | ○ | x | Δ | Δ |
| STAGE 5 | ○ | ○ | ○ | Δ | Δ |
| STAGE 6 | ○ | ○ | ○ | x | Δ |
| STAGE 7 | ○ | ○ | ○ | ○ | x |

○: Data including new data recorded this time are normal.
Δ: Data excluding new data recorded this time are normal.
x: Data are abnormal.

That is, the data which have been accessed when the operation was interrupted, and broken in the respective storage areas, are stored as they are. The old data and data recorded newly in the storage areas accessed before the breakage are normal; and the old data, including no new recorded data, in the storage areas which could not accessed are normal. That is, the occurrence of a situation in which the contents of the data block a are not correctly reflected in the file management data in the main file management block b is expected.

Figure 9:
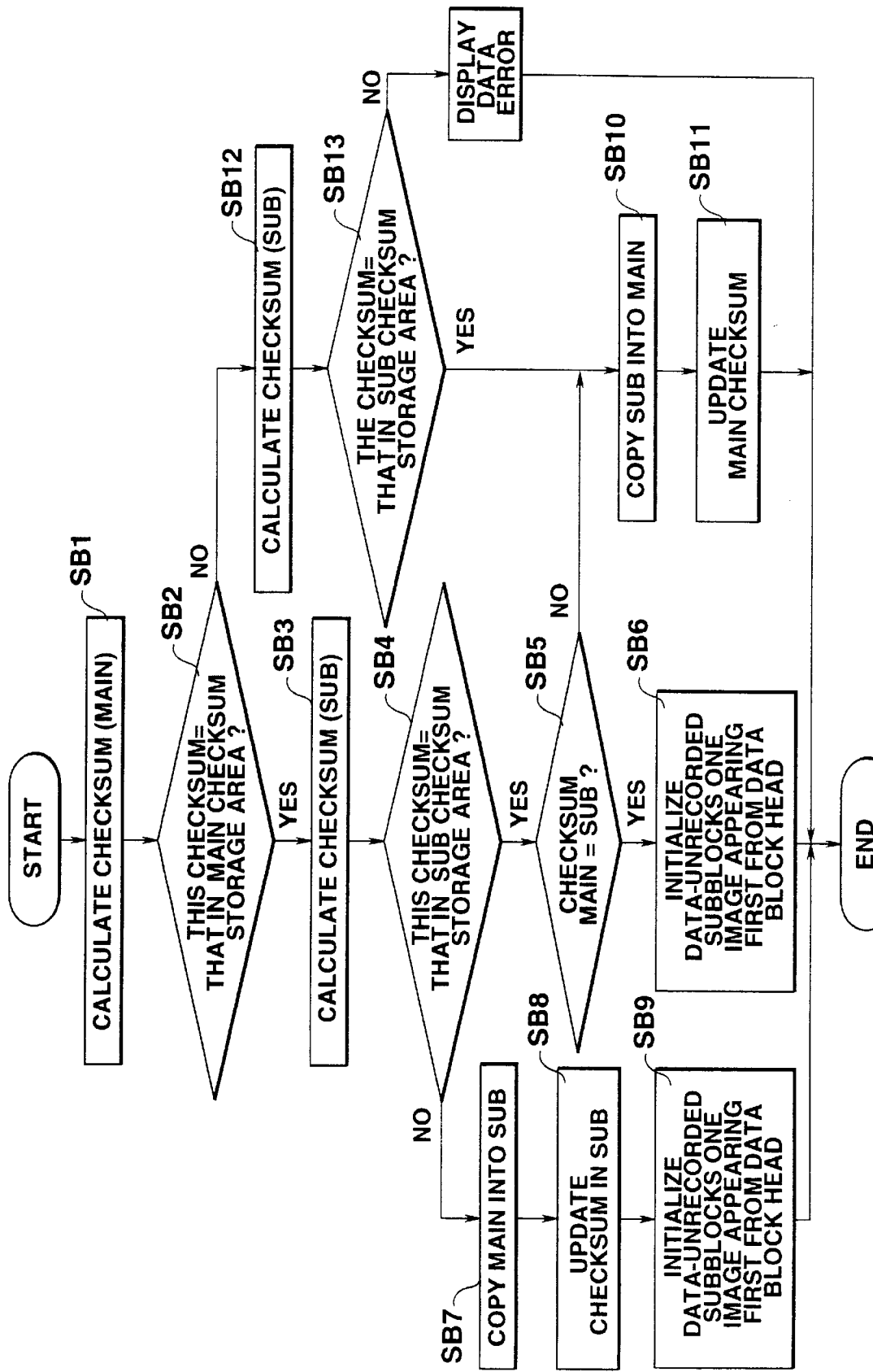
FIG. 9 is a flow chart indicative of a data recognition/recovery operation in the second embodiment.
Figure 10:
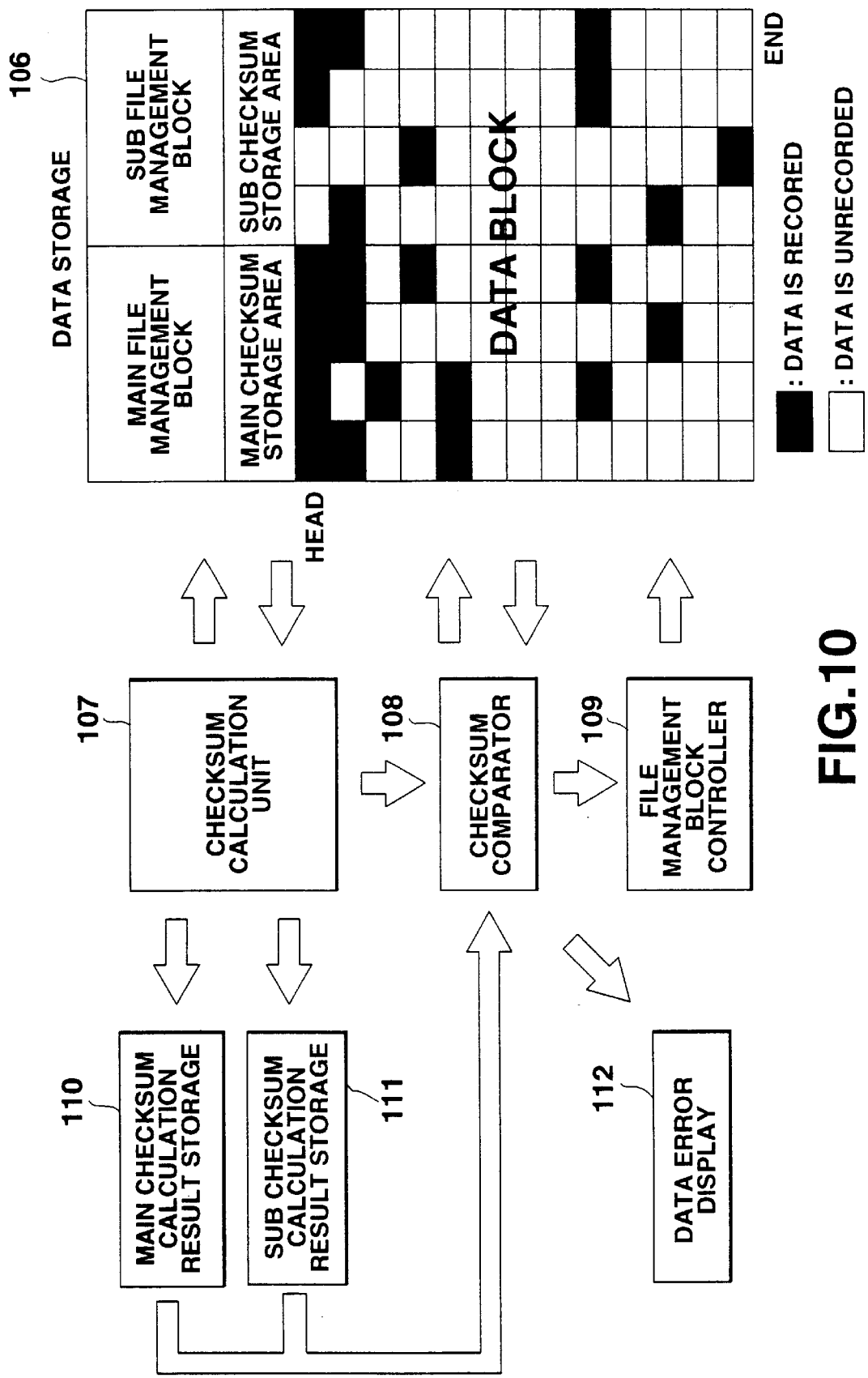
FIG. 10 schematically illustrates the flow of data in the data recognition/recovery operation in the second embodiment.

The recognition and correction or recovery of data performed when the power supply is turned on will be next described with reference to a flow chart of FIG. 9 indicative of the control contents of CPU 10. FIG. 10 is a schematic block diagram indicative of the flow of data in the operation which will be described next. In FIG. 10, a data storage 106 corresponds to the flash memory 8, and a checksum calculation unit 107, a checksum comparator 108, and a file management block control unit 109 each corresponds to CPU 10. A main checksum calculation result storage 110 and a sub checksum calculation result storage 111 each corresponds to RAM 12, and a data error display 112 corresponds to LCD 19.

When the power supply is turned on, CPU 10 is required to perform data recognition/recovery. First, CPU 10 calculates a checksum in the main file management block b of the flash memory 8 and stores the result temporarily into RAM 12 (SB1). CPU 10 then compares the contents of the calculated checksum and the checksum data stored in the main checksum storage area b (SB2) If both are equal, CPU 10 calculates a checksum in the sub file management block c, stores the result temporarily into RAM 12 (SB3), and compares the contents of the calculated checksum and checksum data stored in the sub checksum storage area e (SB4). If both are equal, CPU 10 further compares checksum data stored in both of the main checksum storage area b and sub checksum storage area e (SB5).

When both are equal, that is, data in the memory was accessed normally last time or when the processing was interrupted in the stage 1 or 2 in the last data recording operation, control passes directly to step SA6, which initializes data-unrecorded sub-blocks appearing first from the head of the data block a and terminates the processing. Even when the processing has been interrupted in the stage 2, no abnormal image data remains in the data block a and only a normal image is displayed on LCD 19 in later use. The initialization includes only re-initializing the originally initialized block, so that there is no problem even when the data in the memory was accessed normally last time or when the processing has been interrupted in the stage 1.

When the result of determination at step SB4 is NO and when the contents of the checksum data calculated in the sub file management block c is not equal to the checksum data stored in the sub checksum storage area e, that is, when the processing has been interrupted in the stage 3 or 4 in the last data recording operation, control passes to step SB7, which copies the management data in the main file management block b into the sub file management block c. CPU 10 then recalculates the checksum, using the copied data, writes the result of the calculation into the sub checksum storage area e (SB8), initializes data-unrecorded sub-blocks appearing first from the head of the data block a on the basis of the copied management data in the sub file management block c (SB9), and terminates the processing. Thus, the situation in which the contents of the data block a are not correctly reflected in the file management data in the main file management block b is eliminated.

When the result of the determination at step SB5, is NO and the checksum data stored in both the main and sub checksum storage areas b and e are different from each other or when the processing in the stage 5 has been interrupted in the last data recording operation, control passes to step SB10, which copies the management data in the sub file management block c into the main file management block b. CPU 10 then recalculates the checksum with the copied data, writes the calculated checksum into the main checksum storage a read (SB11) and terminates the processing. Also, by this operation, the state in which the contents of the data block a are not reflected correctly in the file management data in the main file management block b is eliminated.

When the result of the determination at step SB2 is NO and the checksum calculated in the main file management block b is not equal to the checksum data stored in the main checksum storage area d, control passes to step SB12, which calculates the checksum in the sub file management block c and stores the result temporarily into RAM 12. CPU 10 then compares the calculated checksum data and the checksum data stored in the sub checksum storage area e to determine whether they are equal or not (SB13) When the result of the determination is YES, or when the processing has been interrupted in the stage 6 or 7 in the last data recording operation, CPU 10 performs the processing at steps SB10 and SB11, and then terminates the processing. Also, by this operation, the situation in which the contents of data in the data block a are not reflected in the file management data in the main file management block b is eliminated.

Simultaneously, the broken state of the data is eliminated. Thus, in later use, a normal image alone is displayed on LCD 19. In addition, any possible trouble in which correct image data cannot be read out although the image data are not damaged at all is eliminated.

When the result of the determination at step SB13 is NO, CPU 10 determines that the management data stored both in the main and sub file management block b and c are broken and that recovery of the data is impossible, and displays a data error indicative of such undesirable unexpected state on LCD 19 and then terminates the processing. Thus, the operation of the camera based on the file management data in which the abnormality has occurred is stopped and the user is informed of the occurrence of this abnormality.

In summary, when in the second embodiment there is some abnormality in the file management data, for example, when the management data in the main file management block b are broken and/or when the contents of the data block a are not reflected correctly in the file management data, the abnormal data is not used, the camera is operated with always correct file management data to thereby display only an always correct image on LCD 19, and an undesirable situation in which no correct image data can be read out although the data block a is not damaged at all is avoided. That is, the occurrence of a trouble which greatly reduces the reliability of the articles is avoided. In addition, in the second embodiment, the management data is stored both in the main and sub management blocks b and c and a possible abnormality in the file management data in the main file management block b can be corrected with high probability if the management data in the sub file management block c is normal. Thus, the occurrence of a possible trouble which would greatly reduces the reliability of the articles is prevented and thus the reliability of the quality of the articles is greatly improved.

In order to only stop the use of abnormal file management data, the sub file management block c and the sub checksum storage area e of the flash memory 18 are rendered useless. In that case, for example, arrangement maybe such that the main file management block b and the sub file management block c are left in the flash memory 18, that the main checksum storage area d and sub checksum storage area b are abolished, and that the management data stored in both the main and sub file management blocks b and c are directly compared to detect the abnormality in the management data. In this respect, as shown in the second embodiment, the detection of the abnormality through the checksum data indicative, for example, of the data in the main file management block b serves to reduce the quantity of memory required for detecting the abnormality in the file management data. Thus, advantages similar to the above-mentioned advantages are produced without reducing the efficiency of memory use in the camera.

While in the second embodiment the management of data block a, using management data in the main file management block b, in the regular operation in which the record or reproduce modes are set has been illustrated, a possible abnormality in the management data in the sub file management block c is corrected, if the management data in the main file management block b is normal. Thus, the management of the data block a in the normal operation is possible with the use of the management data in the sub file management block c.

While in the second embodiment the application of the present invention to the electronic camera having the flash memory 8 has been illustrated, the present invention may be applicable to other information recording devices which handle data produced on the basis of externally gotten information such as voice as user data. Also, in this case, advantages similar to the above-mentioned advantages are obtained. While in the second embodiment, ROM 11 which contains the program to operate CPU 10 has been illustrated, the program may be fed from another storage medium mounted removably in the camera body.

As described above, according to the second embodiment, when there occurs an abnormality in the management data stored in the management data storage means, the detecting means detects the abnormality. In response to this operation, the inhibiting means inhibits the use of the management data stored in the management data storage means. Thus, any operation on the user data storage means based on the abnormal management data, for example, the writing and/or reading of the user data to/from the user data storage means is prevented.

Thus, the user data is output on the basis of the always normal management data, so that the occurrence of a possible trouble which would greatly reduce the reliability of the information recording device, for example, by outputting abnormal user data, is prevented.

In addition, in the second embodiment the detecting means detects a possible abnormality in the management data stored in the management storage means through check data indicative of the contents of storage in the management data storage means to thereby reduce the quantities of memory required for the detecting work. Thus, advantages similar to the above-mentioned advantages are obtained without greatly reducing the efficiency of use of the memory in the camera.

In the second embodiment, the two management data storage means which store management data are used. If any one of the management data stored in the two management storage means is normal, both the data in the two management data storage means are rendered normal. Thus, when any one of the two management data stored in the two management data storage means is used to manage the user data storage means, and if there occurs an abnormality in the management data used, recovery of the normal management data is achieved with very high probability. As a result, the occurrence of a possible trouble which would greatly reduce the reliability of the article (information recording device) is prevented, which greatly improve the quantity of the article.

In this case, the user data is the picked up image data and applied to the electronic camera, so that advantages similar to the above-mentioned advantages are obtained in the electronic camera.

What is claimed is:

1. An information recording device, comprising:

user data storage means for storing user data produced on the basis of information obtained externally;

management data storage means for storing management data which manages said user data storage means;

detecting means for detecting a possible abnormality in the management data stored in said management data storage means;

inhibiting means responsive to the detection of an abnormality by said detecting means for inhibiting the use of the management data stored in said management data storage means, check data getting means for getting check data indicative of the contents of the data stored in said management data storage means, and check data storage means for storing the check data gotten by said check data getting means, wherein said detecting means detects an abnormality in the management data by comparing the check data stored in said check data storage means and the check data obtained by said check data getting means.

2. The information recording device according to claim 1, further comprising another set of said management storage means, said detecting means, said inhibiting means, said check data getting means and said check data storage means, and update means responsive to detection of an abnormality only by one of said detecting means for updating the management data, stored in one management data storage means corresponding to said one detecting means, with management data stored in the other management data storage means.

3. The information recording device according to claim 2, wherein the user data includes an electrically picked-up image data.

4. The information recording device according to claim 1, wherein the user data includes an electrically picked-up image data.

5. An information recording device comprising:

user data storage means for storing user data produced on the basis of information obtained externally;

management data storage means for storing management data which manages said user data storage means;

detecting means for detecting a possible abnormality in the management data stored in said management data storage means;

inhibiting means responsive to the detection of an abnormality by said detecting means for inhibiting the use of the management data stored in said management data storage means, another set of said management storage means, said detecting means and said inhibiting means, and update means responsive to detection of an abnormality only by one of said detecting means for updating the management data, stored in one management data storage means corresponding to said one detecting means, with management data stored in the other management data storage means.

6. The information recording device according to claim 5, wherein the user data includes an electrically picked-up image data.

* * * * *